(12) United States Patent
Kato et al.

(10) Patent No.: US 8,283,069 B2
(45) Date of Patent: Oct. 9, 2012

(54) ZINC-ALKALINE BATTERY

(75) Inventors: Fumio Kato, Osaka (JP); Yuji Mototani, Kyoto (JP)

(73) Assignee: Panasonic Corporation, Osaka (JP)

( * ) Notice: Subject to any disclaimer, the term of this patent is extended or adjusted under 35 U.S.C. 154(b) by 696 days.

(21) Appl. No.: 11/727,472

(22) Filed: Mar. 27, 2007

(65) Prior Publication Data
US 2007/0231692 A1 Oct. 4, 2007

(30) Foreign Application Priority Data

Mar. 28, 2006 (JP) .................... 2006-087046

(51) Int. Cl.
*H01M 4/42* (2006.01)
(52) U.S. Cl. .............. 429/209; 429/218.1; 429/227; 429/229
(58) Field of Classification Search .......... 429/229, 429/209, 227, 218.1
See application file for complete search history.

(56) References Cited

FOREIGN PATENT DOCUMENTS

| JP | 48-77332 | A | | 10/1973 |
|----|----------|---|---|---------|
| JP | 4-26062 | A | | 1/1992 |
| JP | 4-26065 | A | | 1/1992 |
| JP | 5-166507 | A | | 7/1993 |
| JP | 5-266882 | A | | 10/1993 |
| JP | 2002-270164 | A | | 9/2002 |
| JP | 200317077 | A | * | 1/2003 |
| WO | WO 99/07030 | A1 | | 11/1999 |

* cited by examiner

*Primary Examiner* — Jane Rhee
(74) *Attorney, Agent, or Firm* — McDermott Will & Emery LLP

(57) ABSTRACT

A zinc-alkaline battery includes a negative electrode, a positive electrode, a separator, and an electrolyte. The negative electrode contains a zinc alloy powder including 20 to 50 wt % of a micropowder with a particle size of 75 μm or less. In a constant resistance discharge, a time period for the negative electrode potential to rise is shorter than a time period for the positive electrode potential to fall.

2 Claims, 2 Drawing Sheets

ZINC-ALKALINE BATTERY

FIELD OF THE INVENTION

The present invention relates to zinc-alkaline batteries, in which a zinc alloy is used as the negative electrode active material, an aqueous alkaline solution is used as the electrolyte, and manganese dioxide or nickel oxyhydroxide is used as the positive electrode active material.

BACKGROUND OF THE INVENTION

Zinc-alkaline batteries represented by alkaline-manganese dry cell batteries are widely used as a power source for various devices, due to its all-purpose application and low costs. In zinc-alkaline batteries, a zinc powder of an indefinite form made by gas atomization is used as the negative electrode active material.

However, corrosion of the zinc powder in the alkaline electrolyte generates hydrogen gas, sometimes causing an increase in the internal pressure of the battery and leakage. Thus, it is important to curb the zinc powder corrosion and improve reliability of zinc-alkaline batteries.

As a measure, for example, mercury is added in the negative electrode to amalgamate the zinc powder surface, to increase the hydrogen overvoltage for improving resistance to corrosion. However, with increasing environmental concerns and no-mercury requirement mainly for alkaline-manganese dry cell batteries around 1980 to 1990, instead of such a measure, for example, following (A) to (C) were proposed. Currently, zinc-alkaline batteries using various combinations of (A) to (C) are examined.

(A) For the negative electrode active material, an excellently corrosion-resistant zinc alloy powder including aluminum, bismuth, or indium is used (for example, Japanese Laid-Open Patent Publication No. Hei 5-166507).

(B) To the negative electrode, an inorganic anticorrosive such as indium hydroxide, bismuth hydroxide, indium sulfide, and a sulfide of an alkaline metal is added (for example, Japanese Laid-Open Patent Publication No. Sho 48-77332, Japanese Patent No. 2808822, and Japanese Patent No. 2754864).

(C) To the negative electrode, an organic anticorrosive such as a surfactant is added (for example, Japanese Laid-Open Patent Publication No. Hei 5-266882).

With recent advancement of digital and higher performance devices, electrical load required for zinc-alkaline batteries such as alkaline-manganese dry cell batteries used as a power source for these devices is increasing. As a measure, for example, Japanese Laid-Open Patent Publication No. 2001-512284 and Japanese Laid-Open Patent Publication No. 2002-270164 have proposed usage of a zinc powder including plenty of micropowder with a particle size of 75 μm or less to pass through a sieve of 200 mesh, as the negative electrode active material, to increase reactivity and to improve discharge performance at high load.

However, when a plurality of the batteries including zinc micropowder as the negative electrode active material were connected in series and discharged with a constant resistance, among the plurality of batteries, the battery with a small capacity is prone to overdischarge, and with a further advancement of the overdischarge, the battery is reverse-charged, and the polarity is reversed in at least one of the positive electrode and the negative electrode, sometimes causing significant leakage. To be specific, when a plurality of alkaline-manganese dry cell batteries are connected in series and used as a power source for a toy or a light, and the batteries are left connected after the usage, there is a possibility of leakage. The device may be damaged by such a leakage.

The gas generation reaction (water decomposition reaction) upon the polarity reverse of the positive electrode and the negative electrode is represented by the formula below. When the amount of the current being passed is the same in the positive electrode and in the negative electrode, the amount of hydrogen gas generated by the polarity reverse in the positive electrode becomes twice the amount of oxygen gas generated by the polarity reverse in the negative electrode. Therefore, at the time of overdischarge, the polarity reverse in the positive electrode generates a greater amount of gas than the polarity reverse in the negative electrode, increasing the battery internal pressure and leakage.

(Polarity Reverse Reaction in Positive Electrode)

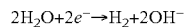

$$2H_2O + 2e^- \rightarrow H_2 + 2OH^-$$

(Polarity Reverse Reaction in Negative Electrode)

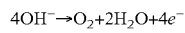

$$4OH^- \rightarrow O_2 + 2H_2O + 4e^-$$

Thus, to solve the conventional problems as noted in the above, the present invention aims to provide a zinc-alkaline battery that is excellent in discharge performance at high load, highly reliable, and able to curb leakage from a significant increase in battery internal pressure involved with gas generation at the time of overdischarge, even when a micropowder negative electrode active material is used.

BRIEF SUMMARY OF THE INVENTION

A zinc-alkaline battery of the present invention comprises a negative electrode, a positive electrode, a separator interposed between the negative electrode and the positive electrode, and an electrolyte, wherein the negative electrode contains a zinc alloy powder including 20 to 50 wt % of a micropowder with a particle size of 75 μm or less, and a time period for a negative electrode potential to rise is shorter than a time period for a positive electrode potential to fall in a constant resistance discharge.

Such a battery as mentioned above, i.e., a battery in which a time period for a negative electrode potential to rise is shorter than a time period for a positive electrode potential to fall in a constant resistance discharge, or a battery regulated with a negative electrode capacity, in which a negative electrode potential rises before a fall of a positive electrode potential in an ending period of a constant resistance discharge, is achieved by including 0.02 to 0.1 part by weight of an additive of at least one selected from the group consisting of a sulfide of alkali metal and indium sulfide per 100 parts by weight of the zinc alloy powder in the negative electrode.

The zinc alloy powder preferably contains 0.005 to 0.1 wt % of at least one selected from the group consisting of bismuth and indium, and 0.001 to 0.05 wt % of at least one selected from the group consisting of aluminum and calcium.

Based on the present invention, by using a micropowder negative electrode active material, a zinc-alkaline battery excellent in discharge performance at high load can be obtained. Also, even when a micropowder negative electrode active material is used, leakage from a significant increase in battery internal pressure involved with gas generation at the time of overdischarge can be curbed, increasing reliability of the zinc-alkaline battery.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
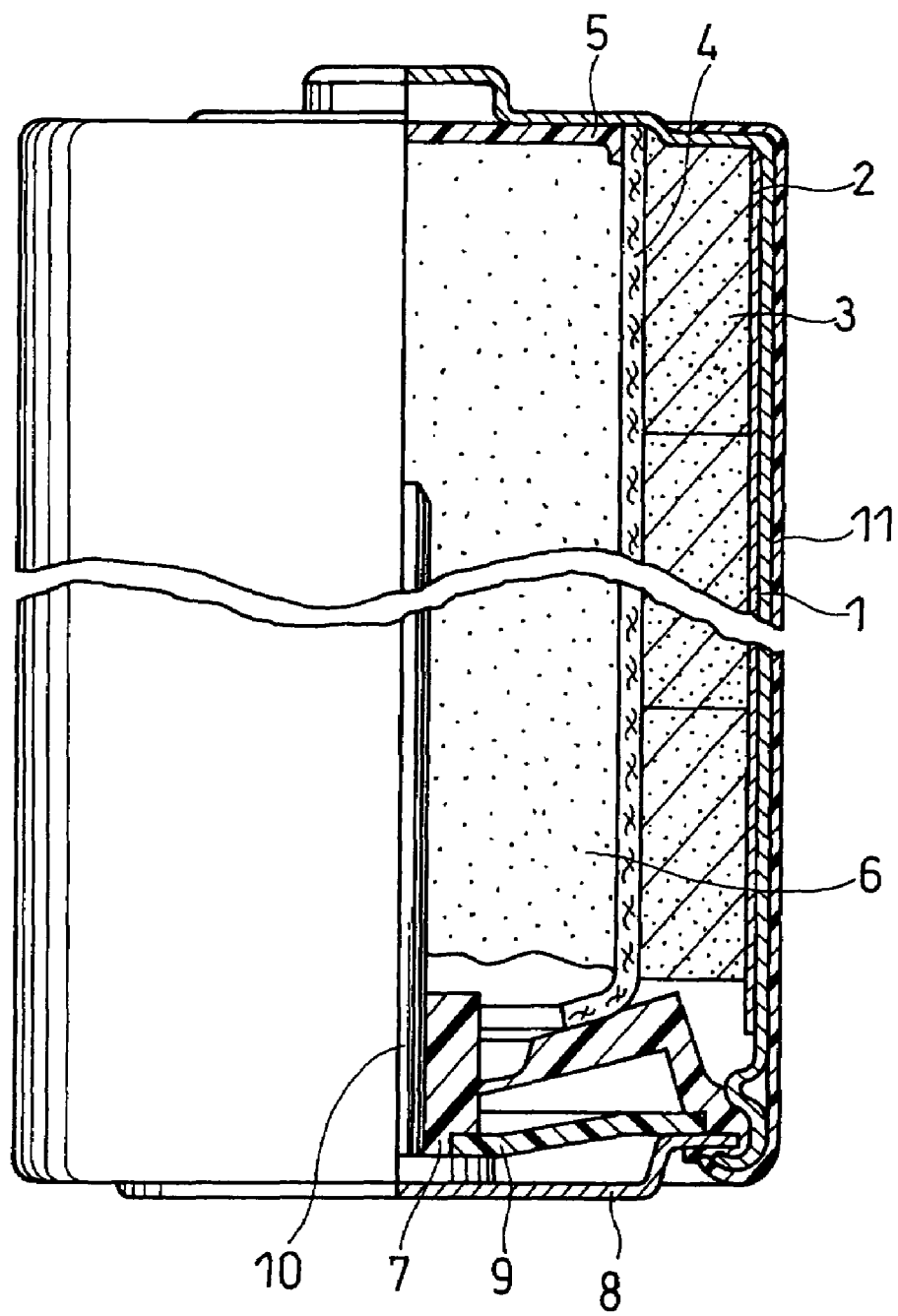
FIG. 1 is a front view of an alkaline dry cell battery in Example of the present invention, with a partially cutaway view showing its cross section.

The present invention relates to a zinc-alkaline battery including a negative electrode, a positive electrode, a separator interposed between the negative electrode and the positive electrode, and an electrolyte, wherein the negative electrode containing a zinc alloy powder including 20 to 50 wt % of a micropowder with a particle size of 75 μm or less, and the negative electrode containing 0.02 to 0.1 part by weight of an additive of at least one selected from the group consisting of a sulfide of alkali metal and indium sulfide per 100 parts by weight of the zinc alloy powder.

As described above, by adding an additive to the negative electrode, the time period for the negative electrode potential to rise can be made shorter than the time period for the positive electrode potential to fall at the time of a constant resistance discharge. That is, a zinc-alkaline battery that a negative electrode potential rises before a positive electrode potential falls in the ending period of a constant resistance discharge so that the battery capacity is regulated with a negative electrode can be obtained.

By thus increasing the negative electrode polarization intentionally in the ending period of discharge to shorten the time period for the negative electrode potential to rise, the polarity reverse due to overdischarging of a small capacity battery which is caused when a plurality of batteries are connected in series can be kept only to the negative electrode polarity reverse (oxygen generation). Therefore, the large amount of hydrogen gas generation by the positive electrode polarity reverse is curbed, the increase in the battery internal pressure is curbed, and the leakage is curbed.

The above-mentioned "a time period for the negative electrode potential to rise" refers to the time period from the start of a discharge to the point when the negative electrode potential show a rapid increase to reach a predetermined potential in the ending period of the discharge. Also, the above-mentioned "a time period for the positive electrode potential to fall" refers to the time period from the start of a discharge to the point when the positive electrode potential shows a rapid decrease to reach a predetermined potential in the ending period of the discharge.

For example, with a AA alkaline-manganese dry cell battery using a positive electrode including electrolytic manganese dioxide as the positive electrode active material and a negative electrode including a zinc alloy as the negative electrode active material (negative electrode theoretical capacity/positive electrode theoretical capacity=1.16), a constant resistance discharge with 10Ω at 20° C. is carried out. At this time, a hole is provided at a portion of the positive electrode case, and a salt bridge is formed between the positive electrode or the negative electrode in the battery and a mercury/mercury oxide reference electrode outside the battery, to determine the positive electrode potential and the negative electrode potential relative to the mercury/mercury oxide reference electrode. The negative electrode theoretical capacity refers to the capacity in the case when all of the negative electrode active material included in the negative electrode is used for the battery reaction. The positive electrode theoretical capacity refers to the capacity in the case when all of the positive electrode active material included in the positive electrode is used for the battery reaction. Additionally, the time period from the start of discharging to the point when the negative electrode potential reaches −1.2 V vs. Hg/HgO is determined as the time period for the negative electrode potential to rise, and the time period from the start of discharging to the point when the positive electrode potential reaches −0.6 V vs. Hg/HgO is determined as the time period for the positive electrode potential to fall. When the negative electrode potential exceeds −1.2 V vs. Hg/HgO, oxygen gas is generated. When the positive electrode potential is below −0.6 V vs. Hg/HgO, hydrogen gas is generated.

As described above, it was found that when a sulfide of alkali metal is added to the negative electrode, without compromising excellent discharge performance at high load obtained when a zinc alloy powder including a large amount of micropowder is used, the rise of the negative electrode potential becomes sooner in the ending period of a constant resistance discharge, and leakage at the time of overdischarge is curbed.

For the sulfide of alkali metal, for example, potassium sulfide and sodium sulfide may be mentioned. A sulfide of alkali metal is dissolved in an alkaline electrolyte to be alkali metal ions and sulfide ions. Then, produced sulfide ions react with zinc when zinc is present to form a film of relatively inactive zinc sulfide at the surface of zinc. When the thickness of this zinc sulfide film is appropriate, discharge reaction of zinc is not obstructed in a normal discharge potential range of a negative electrode. Additionally, although detailed mechanism is not clear, in the zinc powder, particularly due to the effects of the zinc sulfide film formed on the micropowder surface, the negative electrode potential rapidly rises in the ending period of discharge immediately to stop discharging.

When the amount of the sulfide of alkali metal contained in the negative electrode is below 0.02 part by weight per 100 parts by weight of zinc alloy powder, the effect of quickening the rise of the negative electrode potential in the ending period of discharge cannot be obtained sufficiently. Also, when the amount of the sulfide of alkali metal contained in the negative electrode exceeds 0.1 part by weight per 100 parts by weight of zinc alloy powder, the thickness of the zinc sulfide film formed on the surface of zinc particles becomes excessively thick, leading to a decline in discharge performance at high load.

The amount of the sulfide of alkali metal contained in the negative electrode is further preferably 0.02 to 0.06 part by weight per 100 parts by weight of zinc alloy.

When the additive in the negative electrode is a sulfide of alkali metal, also obtained is an effect of curbing the negative electrode corrosion in the case when a fresh battery or a partially discharged battery is stored at high temperature.

The same effects with the case of a sulfide of alkali metal can be obtained when the additive in the negative electrode is indium sulfide as well. When zinc is present in the alkaline electrolyte, indium sulfide is electrodeposited as metal indium to be scattered on the zinc surface, and at the same time, on the remaining zinc surface, a film of zinc sulfide is formed. At this time, when the thickness of the formed zinc sulfide film is appropriate, the discharge reaction of zinc is not obstructed in a normal discharge potential range of a negative electrode. Then, in the ending period of discharge, the negative electrode potential rapidly rises to immediately stop discharging.

When the amount of indium sulfide contained in the negative electrode is below 0.02 part by weight per 100 parts by weight of the zinc alloy powder, the effect of quickening the rise of the negative electrode potential in the ending period of discharge cannot be obtained sufficiently. Also, when the amount of indium sulfide contained in the negative electrode exceeds 0.1 part by weight per 100 parts by weight of the zinc alloy powder, the thickness of the zinc sulfide film formed on the surface of zinc particles becomes too thick, declining discharge performance at high load.

The amount of indium sulfide contained in the negative electrode is further preferably 0.02 to 0.06 part by weight per 100 parts by weight of zinc alloy.

When indium sulfide is added in the negative electrode, also obtained is an effect of curbing the negative electrode corrosion in the case when a fresh battery or a partially discharged battery is stored at high temperature. Further, since the addition of indium sulfide to the negative electrode also achieves an effect of binding zinc particles together by electrodepositing metal indium, discharge performance at high load further improves.

The zinc alloy preferably contains 0.005 to 0.1 wt % of at least one selected from the group consisting of bismuth and indium and 0.001 to 0.05 wt % of at least one selected from the group consisting of aluminum and calcium for improvement in corrosion resistance of zinc alloy. Since a zinc alloy powder including 20 to 50 wt % of a micropowder of below 200 mesh is prone to be corroded by alkaline electrolytes compared with a conventional zinc alloy powder with less micropowder, it is important to improve corrosion resistance of the alloy.

Bismuth and indium to be included in the zinc alloy are unevenly distributed and gather at grain boundaries of zinc crystal, i.e., at a portion vulnerable to corrosion, to increase hydrogen overvoltage and exhibits an effect of curbing zinc corrosion. The total amount of bismuth and indium included in zinc alloy of below 0.005 wt % fails to achieve sufficient anticorrosive effect. The total amount of bismuth and indium in the zinc alloy exceeding 0.1 wt % declines discharge performance. Therefore, the total amount of bismuth and indium in zinc alloy is preferably 0.005 to 0.1 wt %.

Aluminum and calcium to be included in the zinc alloy are distributed unevenly and gather in the proximity of zinc particles to smooth out the surface, and exhibits an effect of curbing zinc corrosion. The total amount of aluminum and calcium contained in the zinc alloy below 0.001 wt % fails to achieve sufficient anti-corrosive effects. The total amount of aluminum and calcium in the zinc alloy exceeding 0.05 wt % declines discharge performance. Therefore, the total amount of aluminum and calcium contained in the zinc alloy is preferably 0.001 to 0.05 wt %.

For the negative electrode, for example, a gelled negative electrode comprising a negative electrode active material powder, a gelling agent, an electrolyte, and the above additive is used. For the negative electrode active material, for example, a zinc alloy powder with an average particle size of 100 to 200 µm is used. For the gelling agent, for example, sodium polyacrylate is used.

For the method for adding the above additive to the negative electrode, for example, at the time of producing a negative electrode, the additive is included in the electrolyte in advance, and then the electrolyte with the additive included is mixed with the negative electrode active material powder and the gelling agent. Based on this method, the additive can be easily dispersed homogenously in the negative electrode.

For the positive electrode, for example, a positive electrode material mixture comprising a mixture of a positive electrode active material, a conductive material, and an electrolyte is used. For the positive electrode active material, a manganese dioxide powder and a nickel oxyhydroxide powder having an average particle size of 30 to 50 µm are used. These may be used singly, or may be used in combination. For the conductive material, for example, a graphite powder with an average particle size of 10 to 20 µm is used.

For the separator, for example, a porous sheet comprising a composite nonwoven fabric of vinylon and rayon with a thickness of 80 to 150 µm is used. The separator is impregnated with the electrolyte at the time of a battery assembly.

For the electrolyte, for example, an aqueous solution of potassium hydroxide with a concentration of about 30 to 40 wt % is used. Zinc oxide (for example, about 2 wt %) may further be included in the aqueous solution of potassium hydroxide.

In the following, Examples of the present invention are described in detail. However, the present invention is not limited to these Examples.

Example 1

In the following, a cylindrical alkaline-manganese dry cell battery (AA) shown in FIG. 1 is made as a zinc-alkaline battery of the present invention. FIG. 1 is a front view of an alkaline-manganese dry cell battery of the present invention, with a partially cutaway view showing its cross section.

(1) Preparation of Gelled Negative Electrode

A zinc alloy powder including 0.005 wt % of Al, 0.02 wt % of Bi, and 0.03 wt % of In was made by gas atomization. Then, the powder was classified with a sieve to adjust the grain size to obtain a zinc alloy powder A with a grain size range of 35 to 150 mesh containing 0 wt % of a micropowder with a particle size of 75 µm or less to pass through a sieve of 200 mesh; and a zinc alloy powder B with a grain size range of 35 to 300 mesh containing 30 wt % of a micropowder with a particle size of 75 µm or less to pass through a sieve of 200 mesh.

Then, after adding an additive to 100 parts by weight of an aqueous solution including 36 wt % of potassium hydroxide and 2 wt % of ZnO, 2 parts by weight of sodium polyacrylate was mixed in to obtain a gelled electrolyte. The gelled electrolyte and the zinc alloy powders were mixed with a weight ratio of 1.0:1.8 to obtain a gelled negative electrode 6. At this time, various types and amounts of the additives were used as shown in Table 1 in combination with zinc alloy powders A and B to obtain 12 types of gelled negative electrode, i.e., negative electrodes (1) to (12). As shown in Table 1, for the surfactants used with the gelled negative electrodes (4), (5), (10), and (11), a polyoxy ethylene alkyl ether compound represented by chemical formula (1) below was used.

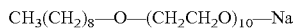

$$CH_3(CH_2)_8-O-(CH_2CH_2O)_{10}-Na \qquad (1)$$

The amounts of the additive in Table 1 are shown by parts by weight per 100 parts by weight of the zinc alloy powder.

TABLE 1

| Gelled Negative Electrode No. | Zinc Alloy Powder | Additive Type | Amount in Gelled Negative Electrode (part by weight) |
|---|---|---|---|
| (1) | A | In(OH)$_3$ | 0.05 |
| (2) | A | K$_2$S | 0.05 |
| (3) | A | In$_2$S$_3$ | 0.05 |
| (4) | A | Surfactant | 0.002 |
| (5) | A | Surfactant | 0.05 |
| (6) | A | Not Included | — |
| (7) | B | In(OH)$_3$ | 0.05 |
| (8) | B | K$_2$S | 0.05 |
| (9) | B | In$_2$S$_3$ | 0.05 |
| (10) | B | Surfactant | 0.002 |
| (11) | B | Surfactant | 0.05 |
| (12) | B | Not Included | — |

(2) Preparation of Positive Electrode Material Mixture Pellet

An electrolytic manganese dioxide powder (average particle size: 40 μm) and a graphite powder (average particle size: 12 μm) were mixed with a weight ratio of 94:6. To 100 parts by weight of the mixture, 1 part by weight of an electrolyte was added, and the mixture was stirred and blended homogenously with a mixer to give a certain grain size. The obtained particulates were pressure-molded to give a hollow cylindrical shape, thereby obtaining a positive electrode material mixture pellet 3.

(3) Preparation of Alkaline-Manganese Dry Cell Battery

To a positive electrode case 1 of a nickel-plated steel plate, a plurality of the positive electrode material mixture pellets 3 were inserted, and a pressure was applied again in the positive electrode case 1 to bring the pellets in close contact with the inner face of the positive electrode case 1. Along the inner face of the positive electrode case 1, a graphite coating film 2 was formed in advance. Then, after inserting a separator 4 and a bottom sheet 5 for insulation at the inner face of the positive electrode material mixture pellets 3, an electrolyte was injected for wetting the separator 4 and the positive electrode material mixture pellets 3. For the separator 4, a porous sheet comprising a composite nonwoven fabric of vinylon and rayon with a thickness of 120 μm was used. For the electrolyte, an aqueous alkaline solution including 2 wt % of ZnO and 36 wt % of potassium hydroxide was used.

After the injection, a gelled negative electrode 6 was filled into a hollow space inside the separator 4. Then, a negative electrode current collector 10 integrated with a resin-made sealing body 7, a bottom plate 8 also functioning as a negative electrode terminal, and an insulating washer 9 was inserted into the gelled negative electrode 6. The opening end of the positive electrode case 1 was crimped to the peripheral end of the bottom plate 8 with the end of the sealing body 7 interposed therebetween, thereby sealing the opening of the positive electrode case 1. Then, the outer surface of the positive electrode case 1 was covered with an outer label 11. An alkaline-manganese dry cell battery was thus made.

Upon making the battery as described above, the gelled negative electrodes (1) to (12) were used to make alkaline-manganese dry cell batteries (1) to (12), respectively.

The amounts of the positive electrode active material and the negative electrode active material were adjusted so that the ratio of the negative electrode capacity to the positive electrode capacity (negative electrode theoretical capacity/positive electrode theoretical capacity) was 1.16.

[Evaluation]

The above alkaline-manganese dry cell batteries (1) to (12) were evaluated based on (I) to (III) below. The batteries (8) and (9) represent Examples, and the batteries (1) to (7) and (10) to (12) represent Comparative Examples.

(I) High-Load Discharge Test

A fresh battery was continuously discharged at 20° C. with a constant electric power of 1000 mW, to determine the time period for the battery voltage to reach 0.9 V.

(II) Storage Test after Partial Discharge

A fresh battery (20 batteries for each type of battery) was discharged at 20° C. with a constant current of 1000 mA for 32 minutes (corresponding to 20% of the positive electrode theoretical capacity), and the battery was stored at 60° C. for two weeks. The ratio of leakage occurrence in the battery was determined at this time (leakage occurrence rate (%)).

(III) Over-Discharge Test

Four fresh batteries were connected in series and to a 40Ω resistor, and allowed to stand at 20° C. for 8 weeks, to be over-discharged. Occurrence and non-occurrence of leakage were checked at this time. In most cases, leakage occurred in the smallest capacity battery among the four batteries connected in series. The leakage occurrence rate (%) was determined by testing 10 sets (40 batteries) for each type of battery, one set being four batteries connected in series with a resistor.

The evaluation results are shown in Table 2.

TABLE 2

| Battery No. | 1000 mW Continuous Discharge Time (min) | Leakage Occurrence Rate at Storage after Partial Discharge (%) | Leakage Occurrence Rate at Overdischarge (%) |
|---|---|---|---|
| (1) | 53.1 | 0 | 0 |
| (2) | 52.4 | 0 | 0 |
| (3) | 53.3 | 0 | 0 |
| (4) | 49.8 | 0 | 0 |
| (5) | 46.0 | 0 | 0 |
| (6) | 50.3 | 40 | 0 |
| (7) | 62.3 | 0 | 80 |
| (8) | 61.1 | 0 | 0 |
| (9) | 63.4 | 0 | 0 |
| (10) | 59.1 | 0 | 70 |
| (11) | 58.0 | 0 | 90 |
| (12) | 59.7 | 65 | 60 |

In the batteries (7) to (12) using zinc alloy powder B, excellent discharge performance at high load was obtained compared with batteries (1) to (6) using zinc alloy powder A. This is probably because of a large amount of the micropowder included in zinc alloy powder B used in the batteries (7) to (12), in which the contact area with the electrolyte was made large and the efficiency in discharge reaction was improved. By comparing the batteries (1) to (6) using zinc alloy powder A, it was clarified that in the batteries (1) and (3) using In(OH)$_3$ and In$_2$S$_3$ for the negative electrode additive, more excellent discharge performance was obtained than that of the batteries (2) and (4) to (6). Also, in the batteries (4) and (5) using surfactants as the additive, discharge performance slightly declined.

By comparing the batteries (7) to (12) using zinc alloy powder B, it was clarified that in the batteries (7) and (9) using In(OH)$_3$ and In$_2$S$_3$ for the negative electrode additive, more excellent discharge performance than that of batteries (8) and (10) to (12) was obtained. Also, in the batteries (10) and (11) using surfactants for the additive, discharge performance slightly declined.

Discharge performance improved in the case when $In(OH)_3$ and $In_2S_3$ i.e., indium sulfide, were used as the additive, probably because metal indium was electrodeposited in the negative electrode and that metal indium connected zinc particles together, improving current collective ability. When surfactants were used for the additive, discharge performance slightly declined probably due to high adsorption of surfactant to zinc alloy, destructing discharge reaction.

The battery (12) using zinc alloy powder B showed vulnerability to leakage at the time of storage after partial discharge, more than the battery (6) using zinc alloy powder A. This is probably because the large amount of micropowder included in zinc alloy powder B declined corrosion resistance. On the other hand, even with the use of zinc alloy powder B, in the batteries (7) to (11) using the negative electrode additive, excellent leakage resistance was obtained while storage after partial discharge. Further, in the batteries (8) and (9) of Examples of the present invention using $K_2S$ or $In_2S_3$ as the negative electrode additive, even when zinc alloy powder B was used, excellent discharge performance at high load as well as excellent leakage resistance at the time of overdischarge were obtained.

In the over-discharge test, leakage occurred in some batteries using zinc alloy powder B. Since there is no correlation to the result of the storage test after partial discharge, which has been regarded as a problem conventionally, the leakage at the time of overdischarge can be regarded as a problem unique to the case when a zinc alloy powder including a large amount of micropowder is used.

To further clarify the phenomenon of leakage upon overdischarge, a constant resistance discharge was carried out at 20° C. with $10\Omega$ for fresh batteries of the battery (1), (7), (8), and (9). At this time, a hole was provided at a portion of the positive electrode case, a salt bridge was formed between the positive electrode or the negative electrode in the battery and a mercury/mercury oxide reference electrode outside the battery, and a positive electrode potential and a negative electrode potential relative to the mercury/mercury oxide reference electrode were determined.

Figure 2:
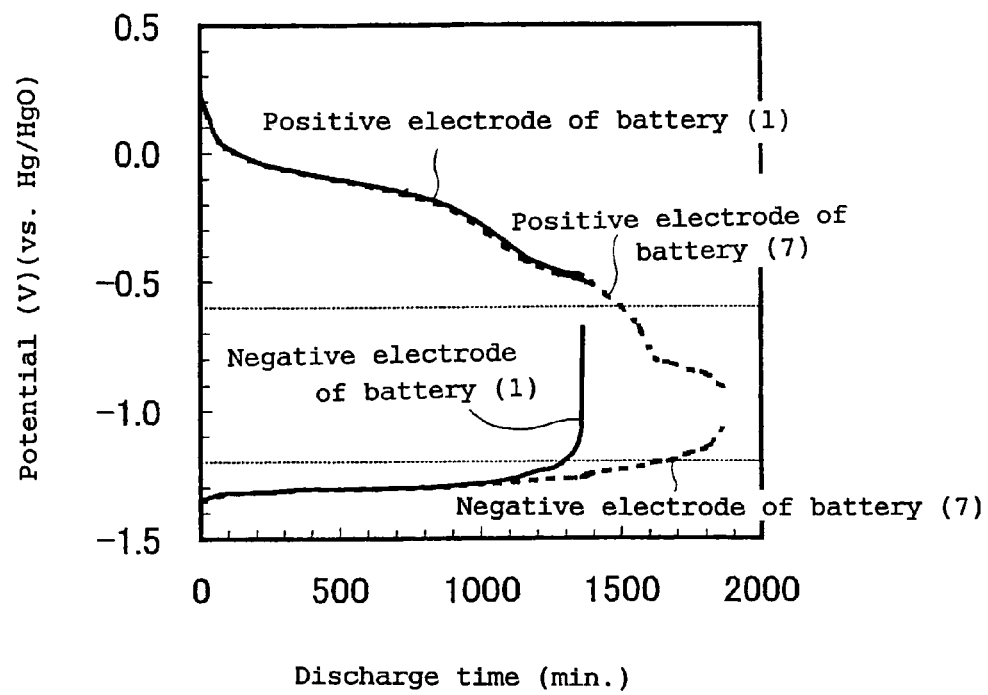
FIG. 2 is a graph showing discharge curves of a positive electrode and a negative electrode of batteries (1) and (7) at a continuous discharge with 10Ω.

The results are shown in FIG. 2. FIG. 2 shows discharge curves of a positive electrode and a negative electrode of the batteries (1) and (7) discharged until the battery voltage reached 0.2 V. In FIG. 2, the discharge curve of battery (1) is shown by a solid line, and the discharge curve of the battery (7) is shown by the broken line. In these batteries, although the negative electrode exceeds the positive electrode when the negative electrode theoretical capacity and the positive electrode theoretical capacity are compared, since the utilization rate of the negative electrode is significantly lower than that of the positive electrode in reality, the discharge capacity (discharge time) is mainly dependent on the negative electrode.

FIG. 2 shows that in the battery (1) using zinc alloy powder A not including a micropowder with a particle size of 75 μm or less, the negative electrode potential rapidly rose in the ending period of discharge to stop discharging. On the other hand, in the battery (7) using zinc alloy powder B including a large amount of a micropowder with a particle size of 75 μm or less, since the reactivity of zinc alloy was high, the time period for the negative electrode potential to rise rapidly in the ending period of discharge was extended, and the time period became almost the same with the time period for the positive electrode potential to rapidly fall.

When four batteries are connected in series, since capacities inevitably vary upon manufacturing batteries, only one battery with a relatively small capacity among the four batteries is sometimes reverse-charged by the remaining three batteries to reverse its polarity in the ending period of discharge to the overdischarging period. The discharge curves in FIG. 2 show that in the case of battery (1), in the battery with a small capacity, only the negative electrode reversed its polarity. On the other hand, in the case of battery (7), in the battery with a small capacity, both of the positive electrode and the negative electrode reversed the polarities. Upon comparing the amount of gas generated when the positive electrode and the negative electrode reversed the polarities (decomposition reaction of water), when the same amount of electricity is passed through the positive electrode and the negative electrode, the amount of hydrogen gas generated upon polarity reverse of the positive electrode is twice the amount of oxygen gas generated upon polarity reverse of the negative electrode. Thus, in the battery (7) in which the polarity of the positive electrode is reversed upon overdischarging, internal pressure of the battery increased significantly compared with that of battery (1), making the battery vulnerable to leakage.

Figure 3:
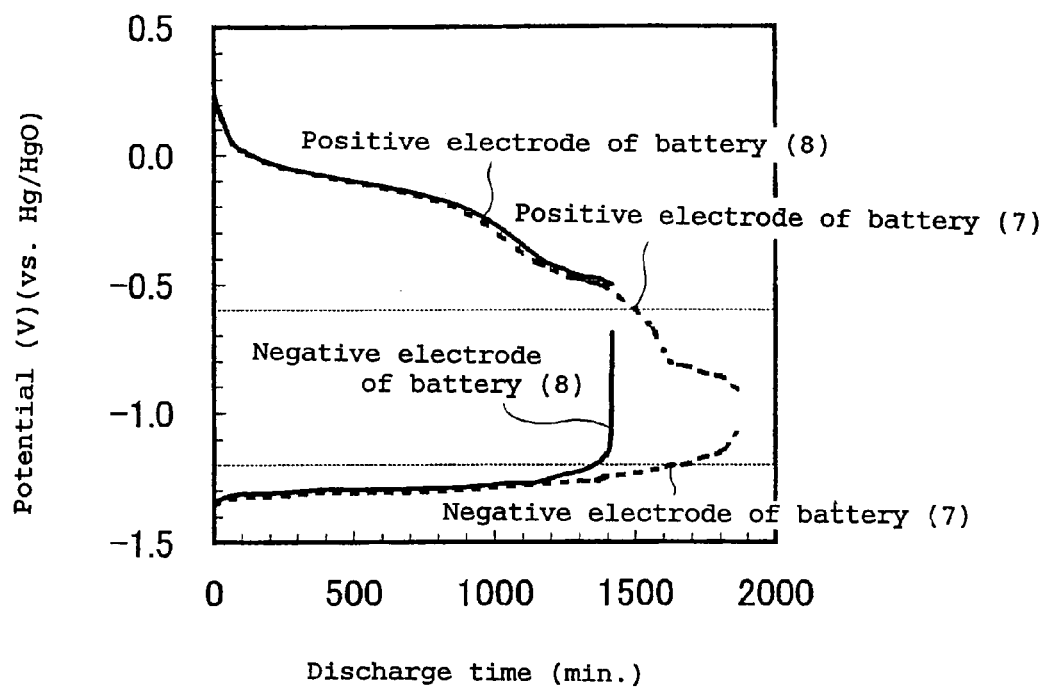
FIG. 3 is a graph showing discharge curves of a positive electrode and a negative electrode of batteries (7) and (8) at a continuous discharge with 10Ω.

FIG. 3 shows discharge curves of the positive electrode and the negative electrode of the batteries (7) and (8) discharged until the battery voltage reached 0.2 V. In FIG. 3, the solid line shows a discharge curve of the battery (8), and the broken line shows a discharge curve of the battery (7). It is clear that even when zinc alloy powder B including a large amount of micropowder was used, in the battery (8) using $K_2S$ as the additive, the negative electrode potential in the ending period of discharge was appropriately controlled.

A sulfide of alkali metal ($K_2S$) dissolves in the electrolyte to be alkali metal ions and sulfide ions. The produced sulfide ions react with zinc when zinc is present, and form a relatively inactive film of zinc sulfide at the zinc surface. Although detailed mechanism is not clear, among zinc alloy powders, due to the effects of the zinc sulfide film formed especially on the zinc micropowder surface, the negative electrode potential rapidly rises in the ending period of discharge before the positive electrode potential falls to immediately stop discharge.

In the battery (9), the same positive electrode and negative electrode potential behavior as in the battery (8) was obtained. When zinc is present in the alkaline electrolyte, $In_2S_3$ is electrodeposited as metal indium to be scattered on the zinc surface, and at the same time, on the remaining zinc surface, a film of zinc sulfide is formed. Therefore, based on the effects of the zinc sulfide film formed, similarly to the case when a sulfide of alkali metal ($K_2S$) is added, the negative electrode potential is rapidly risen in the ending period of discharge before the rapid fall of the positive electrode potential.

As a result of the above determination of the positive electrode and negative electrode potential behavior, the time period for the negative electrode potential to rise and the time period for the positive electrode potential to fall are shown in numeral values in Table 3. The time period for the negative electrode potential to rise was defined as the time period from a start of discharge to the point when the negative electrode potential rapidly rose to reach −1.2 V vs. Hg/HgO in the ending period of discharge. Also, the time period for the positive electrode potential to fall was defined as the time period from a start of discharge to the point when the positive electrode potential rapidly fell to reach −0.6 V vs. Hg/HgO in the ending period of discharge.

TABLE 3

| Battery | Zinc Alloy Powder | Additive Type | Additive Amount | Time Period for Negative Electrode Potential to Rise (min) | Time Period for Positive Electrode Potential to Fall (min) | Leakage Occurrence Rate upon Overdischarge (%) |
|---|---|---|---|---|---|---|
| (1) | A | In(OH)$_3$ | 0.05 | 1305 | 1305< (did not reach −0.6 V) | 0 |
| (7) | B | In(OH)$_3$ | 0.05 | 1680 | 1500 | 80 |
| (8) | B | K$_2$S | 0.05 | 1360 | 1360< (did not reach −0.6 V) | 0 |
| (9) | B | In$_2$S$_3$ | 0.05 | 1375 | 1375< (did not reach −0.6 V) | 0 |

When zinc alloy powder B including a large amount of micropowder is used, in the batteries (8) and (9) including K$_2$S or In$_2$S$_3$ in the negative electrode, the time period for the negative electrode potential to rise became shorter than the time period for the positive electrode potential to fall, enabling to curb leakage upon overdischarge when four batteries are connected in series. This is probably because an increase in battery internal pressure was curbed, since the polarity reverse occurred only in the negative electrode of the battery with a small capacity in the case when four batteries were connected in series and over-discharged.

As described above, based on the present invention, even when a zinc alloy powder including a large amount of micropowder was used, leakage at the time of overdischarge can be curbed while keeping excellent discharge performance at high load.

Example 2

(1) Preparation of Zinc Alloy Powder

In this Example, the grain size of the zinc alloy powder (proportion of the micropowder with a particle size of 75 μm or less) was examined.

A zinc alloy powder including 0.005 wt % of Al, 0.02 wt % of Bi, and 0.03 wt % of In was made by gas atomization. The obtained alloy powder was classified with a sieve into a rough powder with a grain size range of 35 to 200 mesh, and a micropowder with a particle size of 75 μm or less to pass through a sieve of 200 mesh. The rough powder and the micropowder were mixed so that the proportion of the micropowder in the alloy powder satisfy the values shown in Table 4, to prepare zinc alloy powders C to G with the same zinc alloy composition but a different micropowder proportion.

(2) Preparation of Gelled Negative Electrode

To 100 parts by weight of an aqueous alkaline solution including 36 wt % of potassium hydroxide and 2 wt % of ZnO, indium sulfide (0.05 wt % relative to the amount of zinc alloy powder) was added, and then 2 parts by weight of sodium polyacrylate was added and mixed, to obtain a gelled electrolyte. The gelled electrolyte and the zinc alloy powder were mixed in a weight ratio of 1:1.8 to obtain a gelled negative electrode.

An alkaline-manganese dry cell battery was produced in the same manner as Example 1, except that the above gelled negative electrode was used.

Upon making the above gelled negative electrode, the above zinc alloy powders C to G were used to prepare alkaline-manganese dry cell batteries C to G, respectively, and the evaluations mentioned above were carried out. The evaluation results are shown in Table 4. The batteries D to F represent Examples, and the batteries C and G represent Comparative Examples.

TABLE 4

| Battery (zinc alloy powder) No. | Proportion of Micropowder with Particle Size of 75 μm or less in Zinc Alloy Powder (wt %) | Continuous Discharge Time at 1000 mW (min) | Leakage Occurrence Rate while Storage after Partial Discharge (%) | Leakage Occurrence Rate at Overdischarge (%) |
|---|---|---|---|---|
| C | 15 | 54.0 | 0 | 0 |
| D | 20 | 62.5 | 0 | 0 |
| E | 45 | 64.1 | 0 | 0 |
| F | 50 | 64.0 | 0 | 0 |
| G | 55 | 63.2 | 45 | 10 |

Table 4 clarified that excellent discharge performance at high load was achieved and leakage resistance while storage after partial discharge and at overdischarge was both excellent in the batteries D to F of Examples of the present invention, in which 20 to 50 wt % of the micropowder was included in the zinc alloy powder.

Discharge performance at high load declined in the battery C, in which a small amount, i.e., 15 wt %, of the micropowder was included in the zinc alloy powder. Reactivity with the electrolyte became excessively high and leakage resistance after partial discharge greatly declined in the battery G, in which a large amount, i.e., 55 wt %, of the micropowder was included in the zinc alloy powder. Also, when the battery G was connected in series and overdischarged as well, leakage was found in some batteries.

Although indium sulfide was used as the negative electrode additive in this Example, use of a sulfide of alkali metal (potassium sulfide and the like) instead also achieves the same results.

Example 3

In this Example, the amount of potassium sulfide or indium sulfide added in the negative electrode was examined.

To 100 parts by weight of an aqueous solution including 36 wt % of potassium hydroxide and 2 wt % of ZnO, potassium sulfide or indium sulfide in the amount shown in Table 5 was added, and 2 parts by weight of sodium polyacrylate was added and mixed, to obtain a gelled electrolyte. The amount of the additive included in the negative electrode (parts by weight) is the amount per 100 parts by weight of the zinc alloy powder used in the negative electrode. Then, the gelled electrolyte and zinc alloy powder B used in Example 1 was mixed in a weight ratio of 1:1.8, to obtain gelled negative electrodes (13) to (22).

By using the gelled negative electrodes (13) to (22), alkaline-manganese dry cell batteries (13) to (22) were made in the same manner as Example 1, and the evaluations mentioned above were carried out. The evaluation results are shown in Table 5. The batteries (14) to (16) and (19) to (21) represent Examples, and the batteries (13), (17), (18), and (22) represent Comparative Examples.

TABLE 5

| Battery (gelled negative electrode) No. | Additive Type | Amount (part by Weight) | Continuous Discharge Time at 1000 mW (min) | Leakage Occurrence Rate while Storage after Partial Discharge (%) | Leakage Occurrence Rate at Overdischarge (%) |
|---|---|---|---|---|---|
| (13) | $K_2S$ | 0.01 | 62.0 | 5 | 70 |
| (14) | $K_2S$ | 0.02 | 61.2 | 0 | 0 |
| (15) | $K_2S$ | 0.06 | 61.1 | 0 | 0 |
| (16) | $K_2S$ | 0.1 | 60.9 | 0 | 0 |
| (17) | $K_2S$ | 0.12 | 54.2 | 0 | 0 |
| (18) | $In_2S_3$ | 0.01 | 61.4 | 0 | 60 |
| (19) | $In_2S_3$ | 0.02 | 63.1 | 0 | 0 |
| (20) | $In_2S_3$ | 0.06 | 64.2 | 0 | 0 |
| (21) | $In_2S_3$ | 0.1 | 62.1 | 0 | 0 |
| (22) | $In_2S_3$ | 0.12 | 53.3 | 0 | 0 |

In the batteries (14) to (16) and the batteries (19) to (21) of Examples of the present invention, in which the amount of potassium sulfide or indium sulfide in the negative electrode is 0.02 to 0.1 part by weight per 100 parts by weight of zinc alloy powder, excellent discharge performance at high load and excellent leakage resistance both in storage after partial discharge and at overdischarge were obtained. In the batteries (13) and (18), in which the amount of potassium sulfide or indium sulfide in the negative electrode was small, 0.01 part by weight, per 100 parts by weight of zinc alloy powder, leakage was found when a plurality of the batteries were connected in series and overdischarged.

This is probably because the excessively small amount of the additive in the negative electrode made the formation of the zinc sulfide film on the zinc alloy particle surface insufficient, failing to obtain the effect of causing the rapid rise of the negative electrode potential in the ending period of discharge to curb the polarity reverse of the positive electrode at the time of over-discharge.

To confirm the above point, in the same manner as Example 1, the positive electrode and negative electrode potentials at a constant resistance discharge with 10Ω were determined, and the time period for the negative electrode potential to rise, and the time period for the positive electrode potential to fall were determined for the batteries (13), (14), (18), and (19). Table 6 shows the results. In the batteries (13) and (18), the time period for the negative electrode potential to rise became longer than the time period for the positive electrode potential to fall, and the polarity reverse was confirmed in the positive electrode.

TABLE 6

| Battery (gelled negative electrode) No. | Additive Type | Amount (part by weight) | Time Period for Negative Electrode Potential to Rise (min) | Time Period for Positive Electrode Potential to Fall (min) | Leakage Occurrence Rate at Overdischarge (%) |
|---|---|---|---|---|---|
| (13) | $K_2S$ | 0.01 | 1570 | 1503 | 70 |
| (14) | $K_2S$ | 0.02 | 1380 | 1380< (did not reach −0.6 V) | 0 |
| (18) | $In_2S_3$ | 0.01 | 1593 | 1496 | 60 |
| (19) | $In_2S_3$ | 0.02 | 1410 | 1410< (did not reach −0.6 V) | 0 |

In the batteries (17) and (22), in which the amount of potassium sulfide or indium sulfide is large, i.e., 0.12 wt %, even with the use of the zinc alloy powder including a large amount of micropowder, discharge performance at high load declined. This is probably because the excessive amount of additive caused the thickness of the zinc sulfide film formed on the zinc alloy particle surface to become too thick, obstructing discharge reaction.

From the above, it was clarified that the amount of potassium sulfide or indium sulfide included in the negative electrode is preferably 0.02 to 0.1 part by weight per 100 parts by weight of zinc alloy powder.

Example 4

In this Example, composition of zinc alloys used for the negative electrode active material was examined.

Zinc alloy powders (23) to (49) including Bi, In, Al, and Ca with the proportion shown in Table 7 were made by gas atomization. These zinc alloy powders were classified with a sieve to obtain the zinc alloy powders with a grain size range of 35 to 300 mesh containing 30 wt % of a micropowder with a particle size of 75 μm or less to pass through a sieve of 200 mesh.

To 100 parts by weight of an aqueous alkaline solution including 36 wt % of potassium hydroxide and 2 wt % of ZnO, 0.05 wt % of indium sulfide relative to the weight of the zinc alloy powder to be added later was added, and then 2 parts by weight of sodium polyacrylate was added and mixed, to obtain a gelled electrolyte. The obtained gelled electrolyte and zinc alloy powder were mixed in a weight ratio of 1:1.8, to obtain gelled negative electrodes (23) to (49).

Then, by using these gelled negative electrodes (23) to (49), in the same manner as Example 1, alkaline-manganese dry cell batteries (23) to (49) were made and evaluated. The evaluation results are shown in Table 7.

TABLE 7

| Battery (zinc alloy) No. | Amount of Each Element Included in Zinc Alloy (wt %) | | | | Continuous Discharge Time at 1000 mW (min) | Leakage Occurrence Rate while in Storage after Partial Discharge (%) | Leakage Occurrence Rate at Overdischarge (%) |
|---|---|---|---|---|---|---|---|
| | Bi | In | Al | Ca | | | |
| (23) | 0.003 | 0 | 0.005 | 0 | 62.5 | 50 | 0 |
| (24) | 0.005 | 0 | 0.005 | 0 | 62.3 | 0 | 0 |
| (25) | 0.05 | 0 | 0.005 | 0 | 62.8 | 0 | 0 |
| (26) | 0.1 | 0 | 0.005 | 0 | 60.9 | 0 | 0 |
| (27) | 0.12 | 0 | 0.005 | 0 | 54.7 | 0 | 0 |
| (28) | 0 | 0.003 | 0.005 | 0 | 63.3 | 35 | 0 |
| (29) | 0 | 0.005 | 0.005 | 0 | 63.5 | 0 | 0 |
| (30) | 0 | 0.05 | 0.005 | 0 | 63.8 | 0 | 0 |
| (31) | 0 | 0.1 | 0.005 | 0 | 61.4 | 0 | 0 |
| (32) | 0 | 0.12 | 0.005 | 0 | 55.3 | 0 | 0 |
| (33) | 0.001 | 0.002 | 0.005 | 0 | 61.0 | 40 | 0 |
| (34) | 0.002 | 0.003 | 0.005 | 0 | 62.0 | 0 | 0 |
| (35) | 0.2 | 0.3 | 0.005 | 0 | 62.3 | 0 | 0 |
| (36) | 0.4 | 0.6 | 0.005 | 0 | 60.9 | 0 | 0 |
| (37) | 0.5 | 0.7 | 0.005 | 0 | 52.8 | 0 | 0 |
| (38) | 0.02 | 0.03 | 0.0008 | 0 | 62.7 | 25 | 0 |
| (39) | 0.02 | 0.03 | 0.001 | 0 | 61.4 | 0 | 0 |
| (40) | 0.02 | 0.03 | 0.05 | 0 | 61.1 | 0 | 0 |
| (41) | 0.02 | 0.03 | 0.06 | 0 | 53.9 | 0 | 0 |
| (42) | 0.02 | 0.03 | 0 | 0.0008 | 63.2 | 40 | 0 |
| (43) | 0.02 | 0.03 | 0 | 0.001 | 62.2 | 0 | 0 |
| (44) | 0.02 | 0.03 | 0 | 0.05 | 61.0 | 0 | 0 |
| (45) | 0.02 | 0.03 | 0 | 0.06 | 55.5 | 0 | 0 |
| (46) | 0.02 | 0.03 | 0.0004 | 0.0004 | 61.1 | 25 | 0 |
| (47) | 0.02 | 0.03 | 0.0005 | 0.0005 | 62.7 | 0 | 0 |
| (48) | 0.02 | 0.03 | 0.025 | 0.025 | 61.7 | 0 | 0 |
| (49) | 0.02 | 0.03 | 0.03 | 0.03 | 54.2 | 0 | 0 |

In the batteries (23) to (49), based on the effects of indium sulfide added in the negative electrode, leakage when four batteries were connected in series and overdischarged can be curbed. However, in the batteries (23), (28), and (33) in which the total amount of bismuth and indium contained in the zinc alloy powder was below 0.005 wt %, and in the batteries (38), (42), and (46) in which the total amount of aluminum and calcium contained in the zinc alloy powder was below 0.001 wt %, effect of corrosion resistance by the added element in the zinc alloy was insufficient, leading to decline in leakage resistance while storage after partial discharge.

Additionally, in the batteries (27), (32), and (37), in which the total amount of bismuth and indium contained in the zinc alloy exceeded 0.1 wt %, and in the batteries (41), (45), and (49) in which the total amount of aluminum and calcium contained in the zinc alloy exceeded 0.05 wt %, these added elements were excessive, causing obstruction to the zinc discharge reaction, leading to decline in discharge performance at high load.

From the above, it was clarified that in the zinc alloy, 0.005 to 0.1 wt % of bismuth and indium were preferably contained in total, and 0.001 to 0.05 wt % of aluminum and calcium were contained in total. In this Example, although indium sulfide was added in the negative electrode, the same effects can be obtained when a sulfide of alkali metal (potassium sulfide and the like) was added instead.

In the above Examples 1 to 4, AA size cylindrical alkaline-manganese dry cell batteries were made as a zinc-alkaline battery of the present invention. However, the zinc-alkaline battery of the present invention is not limited thereto and may be suitably applied to alkaline-manganese dry cell batteries with sizes other than AA, and also to button-type and prismatic batteries. Although manganese dioxide was used for the positive electrode active material in the above Examples 1 to 4, a positive electrode active material other than manganese dioxide, for example, nickel oxyhydroxide may be used as well to obtain the same effects.

A zinc-alkaline battery of the present invention is excellent in discharge performance at high load as well as leakage resistance, and thus may be applied suitably as a power source for general-purpose devises such as toys and lights, and for various electronic devices such as IT devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A zinc-alkaline battery comprising a negative electrode, a positive electrode, a separator interposed between said negative electrode and said positive electrode, and an electrolyte, wherein said negative electrode contains a zinc alloy powder including 20 to 50 wt % of a micropowder with a particle size of 75 μM or less, a time period for a negative electrode potential to rise is shorter than a time period for a positive electrode potential to fall in a constant resistance discharge, wherein said negative electrode contains 0.02 to 0.06 part by weight of at least one additive selected from the group consisting of a sulfide of alkali metal and indium sulfide per 100 parts by weight of said zinc alloy powder, and wherein said zinc alloy powder contains 0.005 to 0.1 wt % of at least one selected from the group consisting of bismuth and indium, and 0.001 to 0.05 wt % of at least one selected from the group consisting of aluminum and calcium.

2. A zinc-alkaline battery comprising a negative electrode, a positive electrode, a separator interposed between said negative electrode and said positive electrode, and an electrolyte, wherein said negative electrode contains a zinc alloy powder including 20 to 50 wt % of a micropowder with a particle size of 75 μm or less, a negative electrode potential rises before a fall of a positive electrode potential in an ending period of a constant resistance discharge to regulate said battery with a negative electrode capacity, wherein said negative electrode contains 0.02 to 0.06 part by weight of at least one additive selected from the group consisting of a sulfide of alkali metal and indium sulfide per 100 parts by weight of said zinc alloy powder, and wherein said zinc alloy powder contains 0.005 to 0.1 wt % of at least one selected from the group consisting of bismuth and indium, and 0.001 to 0.05 wt % of at least one selected from the group consisting of aluminum and calcium.

* * * * *